(12) United States Patent
Ahiska

(10) Patent No.: US 7,528,881 B2
(45) Date of Patent: May 5, 2009

(54) MULTIPLE OBJECT PROCESSING IN WIDE-ANGLE VIDEO CAMERA

(75) Inventor: Yavuz Ahiska, Esher (GB)

(73) Assignee: Grandeye, Ltd., Guildford, Surrey (GB)

( * ) Notice: Subject to any disclaimer, the term of this patent is extended or adjusted under 35 U.S.C. 154(b) by 654 days.

(21) Appl. No.: 10/837,326

(22) Filed: Apr. 30, 2004

(65) Prior Publication Data
US 2005/0007479 A1  Jan. 13, 2005

Related U.S. Application Data

(60) Provisional application No. 60/467,643, filed on May 2, 2003.

(51) Int. Cl.
H04N 5/225 (2006.01)

(52) U.S. Cl. .................... 348/335; 348/169; 348/14.02; 348/211.12

(58) Field of Classification Search ................. 348/36, 348/39, 143, 148, 169, 14.01, 14.02, 211.12; 382/115, 104, 118, 105
See application file for complete search history.

(56) References Cited

U.S. PATENT DOCUMENTS

| 3,725,563 | A | 4/1973 | Woycechowsky |
| 4,667,236 | A | 5/1987 | Dresdner |
| 4,728,839 | A | 3/1988 | Coughlan et al. |
| 4,763,280 | A | 8/1988 | Robinson et al. |
| 4,821,209 | A | 4/1989 | Hempel et al. |
| 5,027,287 | A | 6/1991 | Artigalas et al. |
| 5,185,667 | A | 2/1993 | Zimmermann |
| 5,321,776 | A | 6/1994 | Shapiro |
| 5,357,281 | A * | 10/1994 | Ikeda et al. ............. 375/240.12 |
| 5,359,363 | A | 10/1994 | Kuban et al. |
| 5,396,284 | A | 3/1995 | Freeman |
| 5,434,617 | A | 7/1995 | Bianchi |

(Continued)

FOREIGN PATENT DOCUMENTS

EP  1 341 383 A2  9/2003

(Continued)

OTHER PUBLICATIONS

Comaniciu, D., Ramesh, V., and Meer, P., "Real-Time Tracking of Non-Rigid Objects Using Mean-shift," IEEE Computer Vision and Pattern Recognition, vol. 1 II, 2000, pp. 142-149.

(Continued)

*Primary Examiner*—Nhan T Tran
*Assistant Examiner*—Amy Hsu
(74) *Attorney, Agent, or Firm*—Groover & Associates

(57) ABSTRACT

A multi object processing video camera is disclosed. The video camera comprises an image scan and capture circuit capable of capturing a wide-angle field of view in high resolution and a processing circuit capable of executing a plurality of software tasks on a plurality of regions from the image sensor and capture circuit based upon the wide angle field of view. The video camera includes memory for storing programs for the processing circuit based upon the captured wide angle field of view and a network connection coupled to the processing circuit. A wide-angle motion video camera for use in surveillance and security applications is disclosed in which multiple objects can be processed by the camera and the results of the processing transmitted to a base station.

21 Claims, 3 Drawing Sheets

U.S. PATENT DOCUMENTS

| | | | |
|---|---|---|---|
| 5,495,292 | A | 2/1996 | Zhang |
| 5,526,041 | A * | 6/1996 | Glatt .......................... 348/143 |
| 5,623,309 | A * | 4/1997 | Yoshimura et al. .......... 348/355 |
| 5,666,157 | A | 9/1997 | Aviv |
| 5,684,937 | A | 11/1997 | Oxaal |
| 5,796,426 | A * | 8/1998 | Gullichsen et al. ...... 348/207.99 |
| 5,809,161 | A * | 9/1998 | Auty et al. .................. 382/104 |
| 5,838,365 | A * | 11/1998 | Sawasaki et al. ............ 348/169 |
| 5,969,755 | A * | 10/1999 | Courtney .................... 348/143 |
| 6,049,281 | A | 4/2000 | Osterweil |
| 6,147,709 | A | 11/2000 | Martin et al. |
| 6,166,729 | A * | 12/2000 | Acosta et al. ............... 715/719 |
| 6,188,777 | B1 * | 2/2001 | Darrell et al. ............... 382/103 |
| 6,215,519 | B1 * | 4/2001 | Nayar et al. ................. 348/159 |
| 6,243,099 | B1 | 6/2001 | Oxaal |
| 6,275,617 | B1 * | 8/2001 | Kondo ......................... 382/236 |
| 6,344,852 | B1 | 2/2002 | Zhu |
| 6,346,967 | B1 * | 2/2002 | Gullichsen et al. ...... 348/207.99 |
| 6,424,370 | B1 * | 7/2002 | Courtney .................... 348/143 |
| 6,483,532 | B1 * | 11/2002 | Girod ....................... 348/14.12 |
| 6,498,598 | B2 * | 12/2002 | Watanabe .................... 345/156 |
| 6,509,926 | B1 | 1/2003 | Mills et al. |
| 6,556,241 | B1 * | 4/2003 | Yoshimura et al. ...... 348/211.99 |
| 6,677,990 | B1 * | 1/2004 | Kawahara .............. 348/211.13 |
| 6,697,104 | B1 * | 2/2004 | Yakobi et al. ............... 348/143 |
| 6,724,421 | B1 | 4/2004 | Glatt |
| 6,731,805 | B2 * | 5/2004 | Brodsky et al. ............. 382/199 |
| 6,754,367 | B1 * | 6/2004 | Ito et al. ...................... 382/103 |
| 6,757,434 | B2 | 6/2004 | Miled et al. |
| 6,763,068 | B2 | 7/2004 | Oktem |
| 6,813,372 | B2 * | 11/2004 | Standridge et al. .......... 382/107 |
| 6,819,355 | B1 * | 11/2004 | Niikawa ................ 348/207.11 |
| 6,970,183 | B1 * | 11/2005 | Monroe ...................... 348/143 |
| 6,975,350 | B1 * | 12/2005 | Mohammed et al. ... 348/207.11 |
| 6,977,672 | B1 * | 12/2005 | Okuno .................. 348/207.11 |
| 6,980,233 | B1 * | 12/2005 | Hirasawa ................. 348/207.1 |
| 6,980,236 | B1 * | 12/2005 | Kojima et al. .......... 348/207.99 |
| 6,982,654 | B2 * | 1/2006 | Rau et al. .................... 340/937 |
| 7,015,949 | B1 * | 3/2006 | Sah ......................... 348/207.1 |
| 7,130,383 | B2 * | 10/2006 | Naidoo et al. ................. 379/37 |
| 7,161,619 | B1 * | 1/2007 | Niida et al. ............ 348/207.11 |
| 7,202,888 | B2 | 4/2007 | Tecu |
| 7,218,761 | B2 * | 5/2007 | McClurg et al. ............ 382/127 |
| 7,286,185 | B2 * | 10/2007 | Wong et al. ................. 348/452 |
| 2003/0128756 | A1 | 7/2003 | Oktem |

FOREIGN PATENT DOCUMENTS

WO     WO 02/062056 A1     8/2002

OTHER PUBLICATIONS

Y. Yardimci, I. Yilmaz, A. E. Cetin, "Correlation Tracking Based on Wavelet Comain Information," Proceedings of SPIE vol. #5204, San Diego, Aug. 5-7, 2003.

A M. Bagci, Y. Yardimci, A. E. Cetin, "Moving Object Detection Using Adaptive Subband Decomposition and Franctional Lower-Order Statistics in Video Sequences," Signal Processing, 82 (12): 1941-1947, Dec. 2002.

C. Stauffer, W. Grimson, "Adaptive Background Mixture Models for Real-Time Tracking." Proc. IEEE CS Conf. on Computer Vision and Pattern Recognition, vol. 2, 1999, pp. 246-252.

"A System for Video Surveillance and Monitoring," in Proc. American Nuclear Society (ANS) Eighth International Topical Meeting on Robotics and Remote Systems, Pittsburgh, PA, Apr. 25-29, 1999 by Collins, Lipton and Kanade.

Aube, 12th International Conference on Automatic Fire Detection, 2001.

X. Zhou, R. Collins, T. Kanade, and P. Metes, "A Master-Slave System to Acquire Biometric Imagery of Humans at Distance", ACM International Workshop on Video Surveillance, Nov. 2003.

* cited by examiner

MULTIPLE OBJECT PROCESSING IN WIDE-ANGLE VIDEO CAMERA

This application claims the benefit of U.S. Provisional Application No. 60/467,643 filed on May 2, 2003.

FIELD OF THE INVENTION

The present innovations relate generally to programmable wide-angle video cameras which can process multiple objects.

RELATED APPLICATIONS

The present innovations are related to the following copending U.S. patent applications:

U.S. patent application, Ser. No. 10/837,012 entitled "Correction of Optical Distortion by Image Processing", filed on even date herewith and assigned to the assignee of the present invention.

U.S. patent application, Ser. No. 10/837,325 entitled "Multiple View Processing in Wide-Angle Video Camera", filed on even date herewith and assigned to the assignee of the present invention.

U.S. patent application, Ser. No. 10/837,019 entitled "Method and System of Simultaneously Displaying Multiple Views for Video Surveillance", filed on even date herewith and assigned to the assignee of the present invention.

BACKGROUND OF THE INVENTION

Many retail stores use video pan, tilt, and zoom, cameras (PTZ) for surveillance of customers to prevent shoplifting. If the camera is pointed and zoomed appropriately a person can be observed in detail and innocent actions distinguished from theft. It is common practice for security personnel to monitor customers with a PTZ camera as they move around a store, but manual tracking is limited by attention span and the number of targets that can be tracked. Similar manual observation is unsuitable for other security tasks such as smoke detection, left package identification, and face recognition. There is a need for reliable automatic processing of images captured by a video camera that is addressed by this disclosure.

Automatic motion detection and object tracking has been developed to facilitate security monitoring by closed circuit television. In video motion detection, comparison is made between a live video image and a stored representation of one or more earlier video images in order to detect relative motion on the basis of a difference between the live and stored images. Most commercial surveillance cameras incorporate motion detection that may be used to trigger an alarm. U.S. Pat. No. 5,396,284 discloses a multiple camera system, which incorporates motion detection performed by a computer connected to the cameras.

Object tracking is a more sophisticated technique than motion detection as it identifies an object and follows its movement. U.S. Pat. No. 5,434,617 discloses means for automatically controlling camera movement to track and display the location of a moving object. A fixed spotting camera is used to capture a field of view, and a moving PTZ camera is directed to the target's location. Information for driving the PTZ camera is obtained with reference to the difference between a current image and a previous image within the spotting camera's field of view. This system requires that a fixed camera always be used in conjunction with the PTZ camera. The reference discusses a specific approach to object tracking but also indicates that vision-based surveillance systems collect far too much video to analyze off-line at some later time; the solution proposed in this paper still relies on central processing and does not propose a distributed solution in which processing is carried out at the source of the video data. In failing to recognize this the prior art misses an important benefit of in-camera processing which is that the total system processing power rises in proportion to the amount of video data captured; for every new camera added more compute is also added. This inherent scaling reduces the cost of deployment because computing power does not need to be over-specified at first installation in anticipation of future expansion.

The use of behaviour analysis software in conjunction with object tracking and motion detection can be used to filter abnormal from normal behaviour. U.S. Pat. No. 5,666,157 describes a device in which video signals of sampled movements of an individual are compared with movements indicative of criminal intent. The level of criminal intent of the individual or individuals is determined and an appropriate alarm signalled. Further analysis software may be used to identify objects left unattended, or other hazards such as smoke or fire. For example, automatic detection of smoke through video cameras is discussed in Aube, $12^{th}$ International Conference on Automatic Fire Detection, 2001, which identifies three distinct processing techniques; in this reference all processing is performed at the base station but the algorithms discussed are applicable to in-camera processing. Many different algorithms may be usefully executed on captured video data and those algorithms will vary with different environments. For example, the algorithms deployed to monitor the entrance to a bank might be different to those used to monitor hazardous material.

All the algorithms discussed produce more accurate results if they are applied to high-resolution image data. If the necessary image processing is applied away from the camera the quantity of data transmitted is very large. For this reason the prior art is unable to cope with the heavy demands of a large security installation such as might be found in an airport. If hundreds of video cameras are used to monitor passenger behaviour then the data flow through the system might be in the region of 1 Terabit (one million million bits) per second. Such a system would be prohibitively expensive to deploy. Further, if each camera is used to track a single object the number of cameras must be very large or many candidates for tracking will be ignored. The ability to track more than one object with a single camera greatly improves the quality of surveillance provided by the system.

The present invention addresses such a need.

SUMMARY OF THE INVENTION

A programmable multi object processing wide-angle video camera is disclosed. The video camera comprises a wide-angle optical system, an image sensor and capture circuit capable of capturing a wide-angle field of view in high resolution and a processing circuit capable of executing a plurality of software tasks on a plurality of regions. One or more such regions may be corrected for geometric distortions introduced by the said optical system. The video camera includes a data memory and a program memory for storing programs for the processing circuit based upon the captured wide angle field of view and a network connection coupled to the processing circuit.

A programmable wide-angle motion video camera for use in surveillance and security applications is disclosed in which multiple objects can be processed by the camera and the results of the processing transmitted to a base station.

DETAILED DESCRIPTION

The present invention relates generally to programmable wide-angle video cameras and more specifically to multiple object processing in such cameras. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present innovations also extend the multiple view wide-angle video camera disclosed in U.S. patent application Ser. No. 10/837,325 "Multiple View Processing in Wide-Angle Video Camera", which is included here by reference and adds to it the ability to independently process several areas of the captured views at the same time. The wide-angle view enables software within the camera to monitor a specific object without losing sight of other objects, hence multiple objects may be monitored simultaneously. In this context an object may be for example, but not limited to, a person, a vehicle, an unattended package, smoke, or fire.

Figure 1:
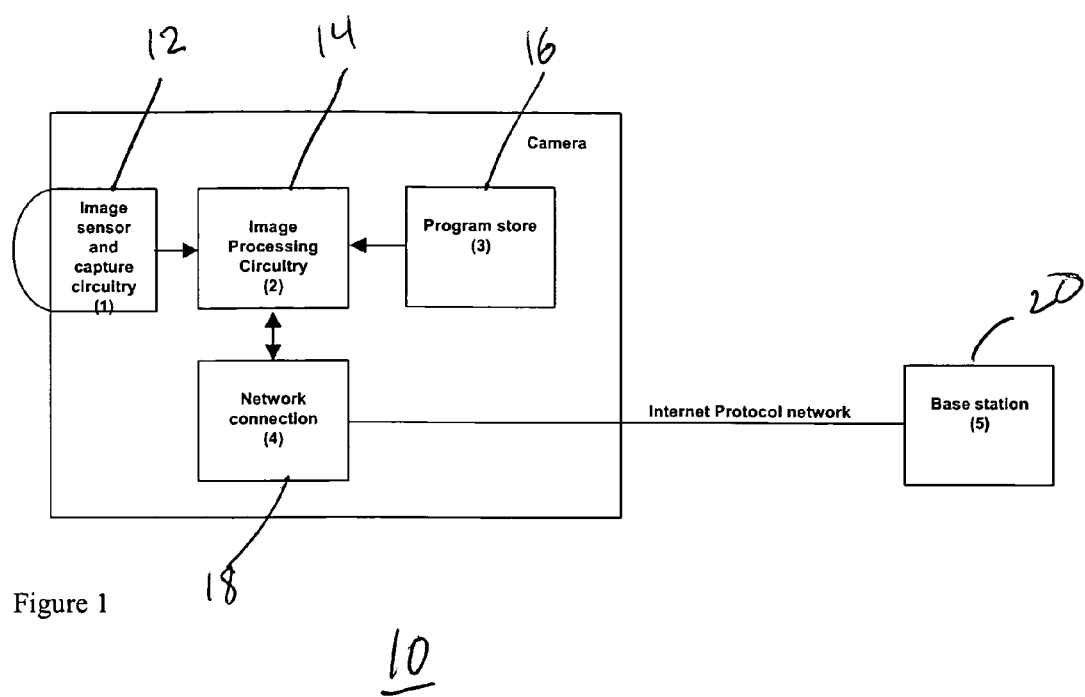
FIG. 1 illustrates a system in accordance with the present invention.

Referring to FIG. 1, a system 10 in accordance with the present invention consists of an image sensor and circuitry 12 which captures a wide-angle view, a processing circuit 14 which executes programs upon the captured image, a program store 16 to hold software programs for execution by the processing circuit, and a network connection 18 which connects the camera to a base station 20 or other camera. In another embodiment a magnetic disk drive is added for the storage of captured video. This captured video may be the full wide-angle frame, or regions of interest within the frame, and may be as captured or after processing for geometric distortions introduced by the optical system. When an event is detected it may be useful to refer back to previous frames; for example, behaviour analysis in software may detect the actions of a pick-pocket, and then refer to previously captured video to find a good representation of the pick-pocket's face. Other processing algorithms may similarly find access to stored video data useful.

Figure 2:
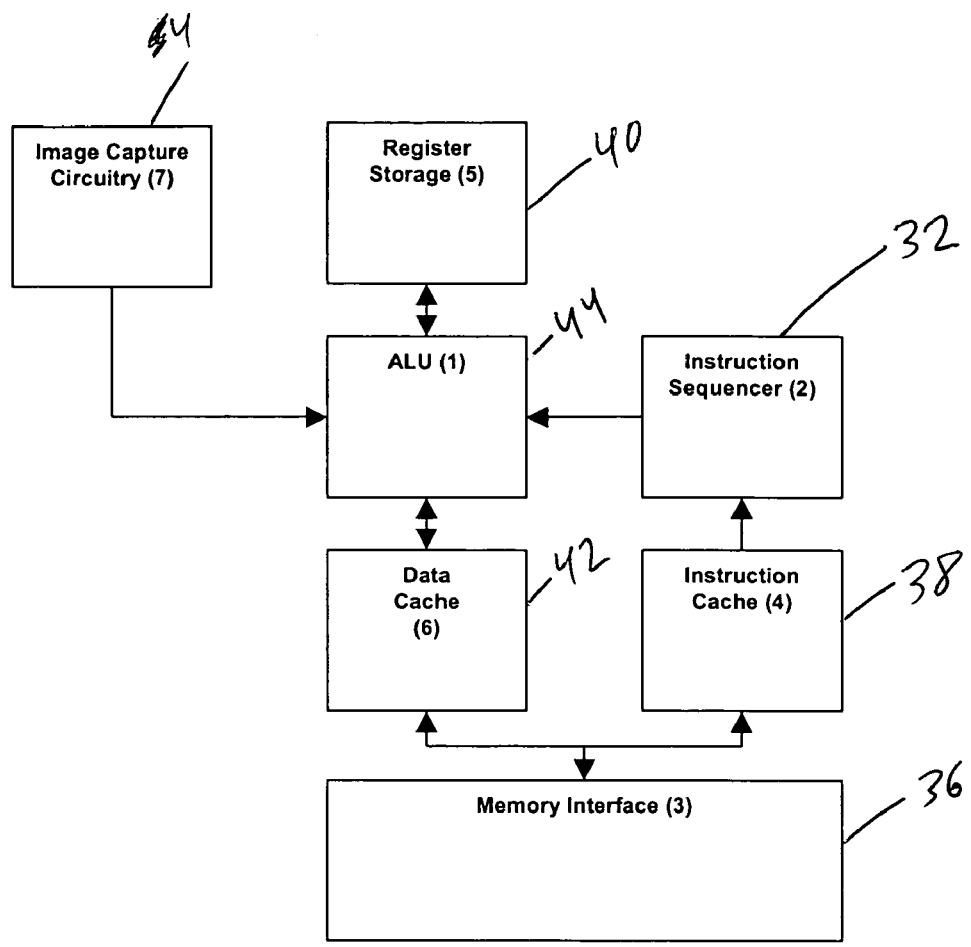
FIG. 2 illustrates one embodiment of an image processing circuit.

In one embodiment, the image processing circuit 14 shown in FIG. 2 is represented by a type of circuit known as a digital signal processor. In this arrangement an arithmetic and logic unit 30 is controlled by an instruction sequencer 32 that in turn fetches instructions from memory 36 via an instruction cache 38. The instructions executed by the instruction sequencer may cause the ALU 44 to operate upon data held in register storage 40 or memory accessed via a cache 42, or the output of the image capture circuitry 4. The program to execute is held in volatile or non-volatile memory within the camera and may be loaded at the time of manufacture, or as an upgrade procedure in the field, or downloaded to the camera during normal operation.

In another embodiment, image processing circuitry may be made of a number of digital signal processors or application specific processors each with its own data and program memory.

Figure 3:
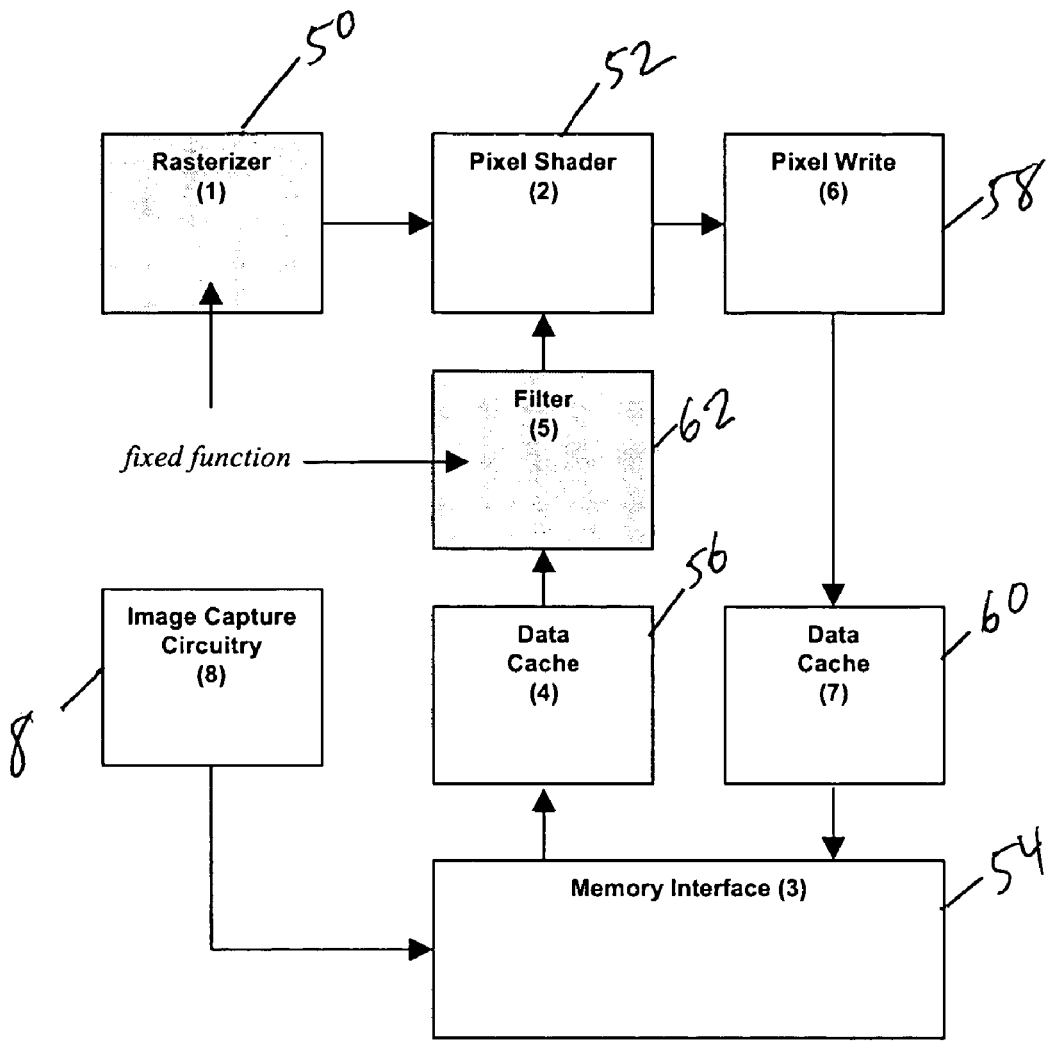
FIG. 3 illustrates the implementation of algorithms with a combination of fixed-function and programmable hardware.

It should however be clear to those skilled in the art that the algorithms mentioned here may be implemented with a combination of fixed-function and programmable hardware such as is shown in FIG. 3. In this alternative embodiment the image processing circuitry 14" is implemented by a programmable graphics processor in which the rasterizer 50 produces the coordinates of the output image and passes them to the pixel shader 52 which calculates the pixels in the captured video image to be used, causes them to be read from memory 54 via a cache 56, optionally filtered 62, and processed by the pixel shader 52. The resulting pixels are transferred to the pixel write unit 58, which writes them to memory via a cache 60. In this embodiment data from the image capture circuit 8 is fed directly to the same memory that is used hold the resulting pixel data. In another embodiment the image processing circuitry may be a combination of a digital signal processor and a graphics processor while the control circuitry is implemented with a commonly available central processing unit such as that found in personal computers. Those skilled in the art will recognise that these examples are indicative of possible implementations without being exhaustive.

The network connection referred to in FIG. 1 enables new programs to be loaded into the camera as necessary. It also facilitates the loading of data for use by processing software within the camera. This might include facial data used in face recognition software such that one or more cameras may be constantly search for faces without transmitting any information to the base station until a possible match is found. In the same way the camera may hold vehicle license plate data and only transmit information to the base station when a match is found.

In one embodiment, the programs to be executed are stored in local non-vilatile storage such as magnetic storage or read only solid state memory.

The camera may transmit the results of the in-camera processing to another camera to facilitate object tracking across discontinuous fields of view. If one camera has determined that an object is suspicious and should be tracked it may signal the position and trajectory to other cameras such that the object does not have to be re-acquired as it moves into the field of view of the other camera. Similarly, if a camera determines an event to be suspicious it may signal the position of this event to other cameras such that the other cameras may validate the first camera's analysis before the alarm to the base station is signalled. For example, in-camera processing may detect smoke within its field of view but request confirmation from other points of view before raising an alarm. In another example in-camera processing may identify behaviour as illegal but be unable to record the perpetrators face so the position may be sent to another camera which captures an image of the face.

The foregoing has described methods for the implementation of a multiple object processing video camera that are given for illustration and not for limitation. Thus the invention is to be limited only by the appended claims.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A multi object processing video camera, comprising:
a wide-angle optical unit connected to a image sensor and a capture circuit configured to capture a wide-angle field of view in high resolution;
a processing circuit inside the camera which:
executes a plurality of software tasks on a plurality of regions from said image sensor and capture circuit based upon said wide-angle field of view one of said software tasks being always the correction of geometric distortions introduced by said wide-angle optical system;
monitors multiple specific objects without losing sight of other objects, the processing of the digital image covering a wide-angle frame or regions of interest within the frame, and simultaneously able to monitor multiple objects;
selectively conditions transmission of a partial set of images from the camera based on the results of image processing event detection and said action of monitoring multiple objects in ones of software tasks; and
an internal program and data memory to hold said software for execution by said processing circuit.

2. The multi object processing video camera of claim 1 which includes a network connection coupled to said processing circuit.

3. The multi object processing video camera of claim 2 wherein said network connection utilizes an Internet protocol.

4. The multi object processing video camera of claim 2 in which said network connection is used to receive control commands from a base station.

5. The multi object processing video camera of claim 2 in which said network connection is used to load software into said program and data memory.

6. The multi object processing video camera of claim 1 in which said software tasks include tracking of object movement, said object's spatial coordinates and or trajectory being transferred to one or more base stations or other cameras.

7. The multi object processing video camera of claim 2 in which said software tasks include smoke detection.

8. The multi object processing video camera of claim 1 in which said software tasks include left package detection.

9. The multi object processing video camera of claim 2 in which said software tasks include face recognition by comparison with data loaded into said camera by said network connection.

10. The multi object processing video camera of claim 2 in which said software tasks include vehicle license plate recognition by comparison with data loaded into said camera by said network connection.

11. The multi object processing video camera of claim 1 in which said software tasks include behavior analysis.

12. The multi object processing video camera of claim 1 including magnetic storage in addition to said program and data memory for the purpose of storing captured video data, said data being either wide-angle or a selected region and either as captured or processed.

13. The multi object processing video camera of claim 12 in which said stored video data is made available for further processing within said camera.

14. A multi object processing video camera, comprising:
a wide-angle optical unit connected to a image sensor and a capture circuit configured to capture a wide-angle field of view in high resolution;
a processing circuit within the camera which:
executes a plurality of software tasks on a plurality of regions from said image sensor and capture circuit based upon said wide-angle field of view, one of said software tasks being always the correction of geometric distortions introduced by said wide-angle optical system;
monitors multiple specific objects without losing visibility of other objects, the processing of the digital image covering a wide-angle frame or regions of interest within the frame, and simultaneously monitors multiple objects; and
selectively conditions transmission of images from said camera to a base station connected to said camera based on the results of an event detection algorithm and said action of monitoring multiple objects in at least one of said software tasks; and
an internal program and data memory to hold said software for execution by said processing circuit.

15. The video camera of claim 1 wherein said image processing circuit is a digital signal processor.

16. The video camera of claim 15 wherein said digital signal processor is comprised of an arithmetic and logic unit, an instruction sequencer, an instruction cache, a memory module, a data cache, and a register storage.

17. The video camera of claim 15 wherein said digital signal processor is used to execute algorithms upon an image selected from the group consisting of: sharpening, contrast adjustment, color adjustment, resizing, motion detection, smoke detection, and abandoned package detection.

18. The video camera of claim 1 wherein said image processing circuit is a programmable graphics processor.

19. The video camera of claim 18 wherein said programmable graphics processor is comprised of a rasterizer, a pixel shader, a memory module, a data cache, a pixel filter, and a pixel write unit.

20. A multi object processing video camera, comprising:
a wide-angle optical unit connected to a image sensor and a capture circuit configured to capture a wide-angle field of view in high resolution;
a processing circuit within the camera which:
executes a plurality of software tasks on a plurality of regions from said image sensor and capture circuit based upon said wide-angle field of view, one of said software tasks being always the correction of geometric distortions introduced by said wide-angle optical system; and
selectively conditions transmission of a partial set of images from said wide-angle optical unit to a base station connected to said wide-angle optical unit based on:
the results of event detection image processing in at least one of said software tasks; and
a validation of said results by another multi object processing wide-angle optical unit connected to said wide-angle optical unit; and the wide-angle optical unit including software to autonomously identify a specific object, while maintaining sight of other objects, to track and communicate position and trajectory data of the object to at least one other wide-angle optical unit, or receive position and trajectory data from another wide-angle optical unit, and automatically maintain sight of the specific object as it moves across the field of view of multiple wide-angle optical units; and a program and data memory to hold said software for execution by said processing circuit.

21. The multi object processing video camera of claim 14, further comprising:

the processing circuit produces coordinates of an output image and passes them to a coupled pixel shader, which calculates the pixels in the captured digital image to use and reads said pixels from a memory to generate the high resolution image.

* * * * *